Sept. 11, 1923.
J. T. WELCH
FISHING REEL
Filed Jan. 12, 1922
1,467,407
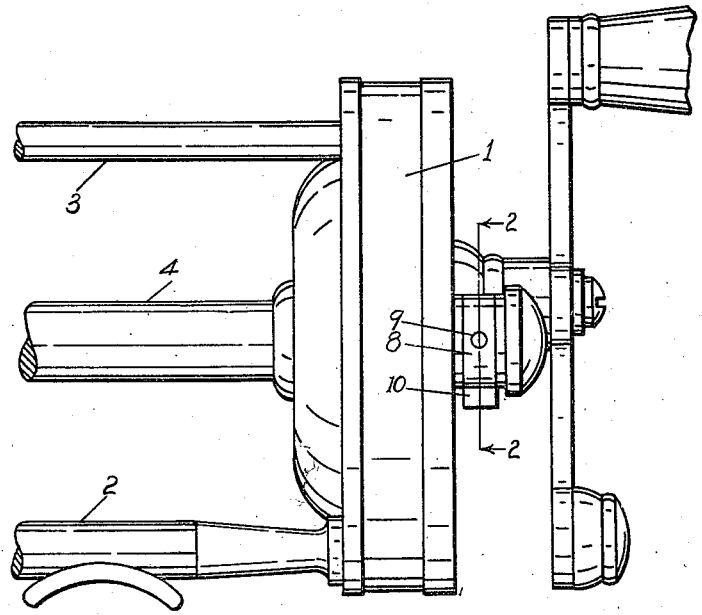
Fig. I.
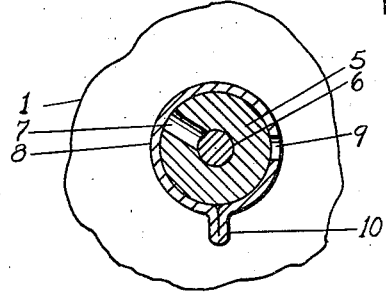
Fig. II.
INVENTOR.
JACK T. WELCH
BY Chappell Earl
ATTORNEYS Patented Sept. 11, 1923.

1,467,407

UNITED STATES PATENT OFFICE.

JACK T. WELCH, OF DOWAGIAC, MICHIGAN, ASSIGNOR TO JAMES HEDDON'S SONS, OF DOWAGIAC, MICHIGAN.

FISHING REEL.

Application filed January 12, 1922. Serial No. 528,688.

*To all whom it may concern:*

Be it known that I, JACK T. WELCH, a citizen of the United States, residing at Dowagiac, county of Cass, State of Michigan, have invented certain new and useful Improvements in Fishing Reels, of which the following is a specification.

This invention relates to improvements in fishing reels.

The main object of the invention is to provide in a fishing reel an improved structure whereby the spool shaft bearings may be efficiently lubricated and at the same time effectively protected.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is fully illustrated in the accompanying drawing forming a part of this specification, in which:

Fig. I is a side view of a fishing reel embodying the features of my invention, one end of the frame and a portion of the crank being broken away.

Fig. II is a detail section on a line corresponding to line 2—2 of Fig. I.

In the drawing similar reference characters refer to similar parts in both views.

Referring to the drawing, 1 represents one of the head members of a fishing reel frame and 2, 3 are the pillars thereof. 4 is the spool. A cylindrical bearing member 5 is mounted on the head member 1 to project therefrom, the journal of the spool being shown at 6, Fig. II. This bearing is provided with an oil hole 7 opening at its periphery.

A continuous ring or band 8 is rotatably mounted upon the bearing member 5 and is provided with a hole 9 which is adapted to be brought into register with the hole 7 so that the lubricant may be introduced by means of an oil can. The band 8 has a fold 10 therein constituting a finger piece and also a spring member for holding the band in frictional engagement with the bearing.

With the parts thus arranged the closure band cannot be accidentally disengaged or lost and constitutes an effective prevention for the escape of lubricant therethrough and at the same time is economical in structure.

Having thus described my invention, what I claim as new and desire to secure by Letters Patent is:

1. The combination with a fishing reel frame comprising a head member, of a cylindrical spool shaft bearing mounted on said head member to project therefrom and having a transverse oil hole therein opening at its periphery, and a continuous band mounted on said bearing and constituting a closure for said oil hole and having a hole therein adapted to be brought into register with the oil hole of the bearing, said band having a fold therein constituting a spring and projecting finger piece.

2. The combination with a fishing reel frame comprising a head member, of a cylindrical spool shaft bearing mounted on said head member to project therefrom and having a transverse oil hole therein opening at its periphery, and a continuous band mounted on said bearing and constituting a closure for said oil hole and having a hole therein adapted to be brought into register with the oil hole of the bearing.

3. In a fishing reel comprising a cylindrical spool shaft bearing provided with an annular peripheral recess and a transverse oil hole opening into said recess, and a continuous band mounted in said recess and having a hole therein adapted to be brought into register with said oil hole of said bearing, said band having a fold therein constituting a finger piece and also a spring whereby the band engages the bearing under spring pressure, for the purpose specified.

In witness whereof I have hereunto set my hand and seal in the presence of two witnesses.

JACK T. WELCH. [L. S.]

Witnesses:
 EDW. J. MCMAHAN,
 L. J. WOOSTER.